United States Patent [19]
Dickson

[11] Patent Number: 5,690,179
[45] Date of Patent: Nov. 25, 1997

[54] ENHANCED AGRICULTURAL AERATOR

[76] Inventor: Wayne Dickson, 145 Loretta La., Luthersville, Ga. 30251

[21] Appl. No.: 589,019

[22] Filed: Jan. 19, 1996

[51] Int. Cl.$^6$ .................................................. A01B 45/02
[52] U.S. Cl. ............................ 172/21; 172/122; 172/554
[58] Field of Search ................................ 111/52, 102, 103, 111/200, 901, 902, 904; 172/21, 22, 122, 540, 554, 713

[56] References Cited

U.S. PATENT DOCUMENTS

| 2,649,061 | 8/1953 | Hawkins et al. | 172/21 X |
|---|---|---|---|
| 2,881,847 | 4/1959 | Strasel | 172/21 |
| 3,171,498 | 3/1965 | Logan | 172/22 |
| 3,756,203 | 9/1973 | Dedos | 172/22 X |
| 3,794,121 | 2/1974 | Drozak | 172/21 |
| 4,094,363 | 6/1978 | Michael | 172/349 |
| 4,383,580 | 5/1983 | Huxford | 172/21 |
| 4,619,329 | 10/1986 | Gorbett | 172/21 |
| 4,776,404 | 10/1988 | Rogers et al. | 172/21 |
| 4,840,232 | 6/1989 | Mayer | 172/21 |
| 5,029,652 | 7/1991 | Whitfield | 172/21 |
| 5,398,768 | 3/1995 | Staples | 172/21 |

FOREIGN PATENT DOCUMENTS

| 198241 | 5/1923 | United Kingdom . |
|---|---|---|
| 679253 | 9/1952 | United Kingdom . |

*Primary Examiner*—Terry Lee Melius
*Assistant Examiner*—Robert Pezzuto

[57] ABSTRACT

The present invention is a device that aerates lawn or soil using a unique triangular shaped tine or spike. The spikes are arranged on drums in a pattern. The drums can be filled with a fluid such as water or a granular material such as sand to adjust the depth to which the spikes penetrate. The drums may be angled with respect to the direction of travel to impart a transverse movement to the soil. The triangular shape of the spikes and the transverse movement greatly enhances the degree of aeration and results in significantly better aeration compared to using round spikes and coring devices. The surface is not cluttered with cored debris, so the present invention can be used on playing fields or lawns where post aeration appearance is important.

13 Claims, 6 Drawing Sheets

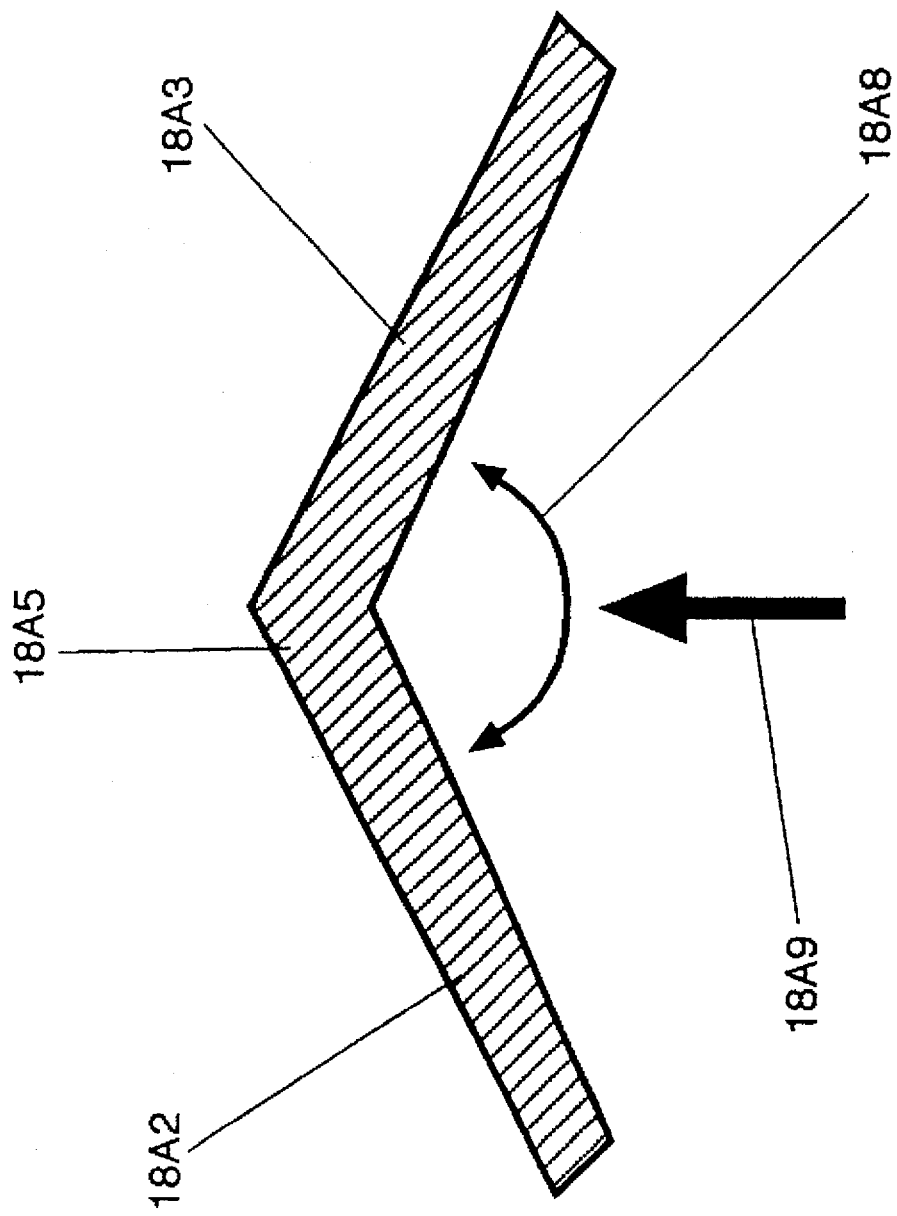

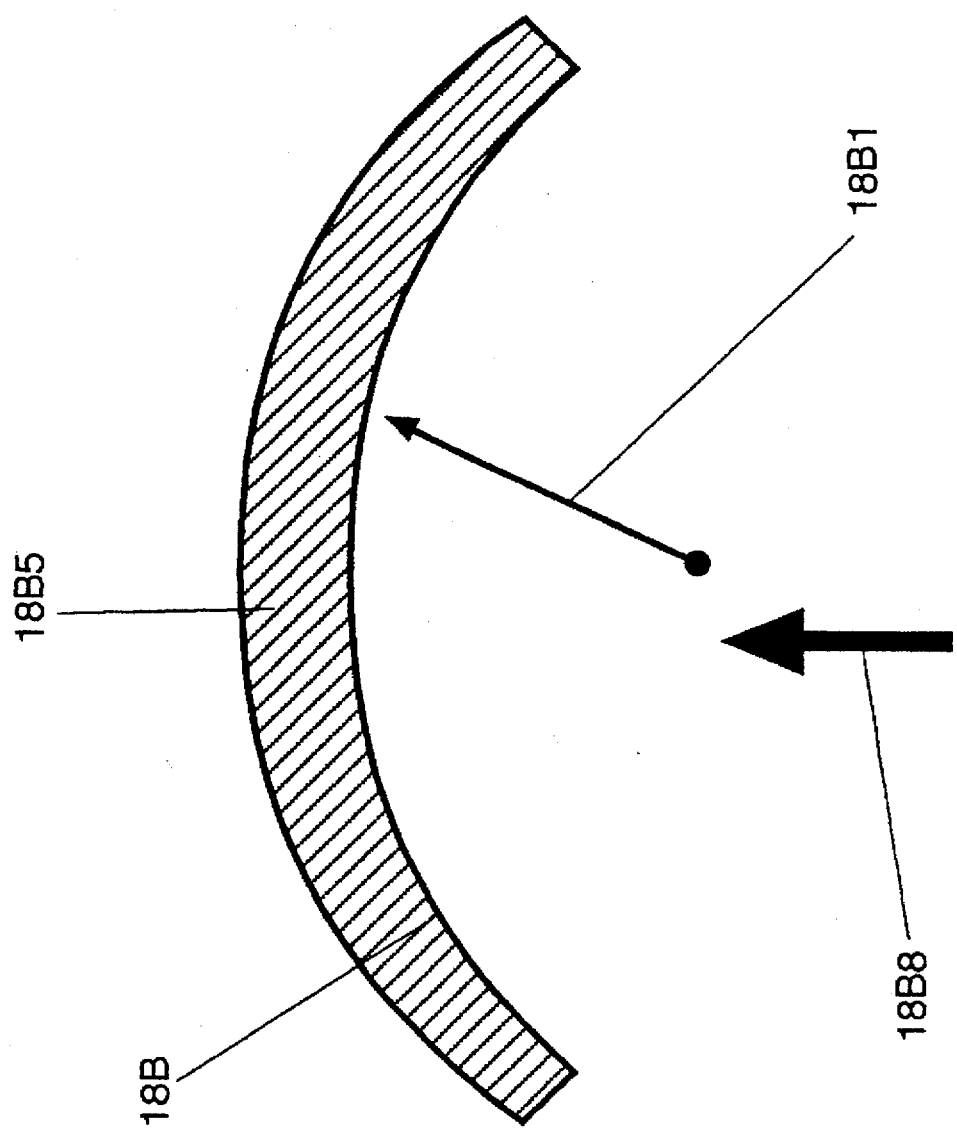

ENHANCED AGRICULTURAL AERATOR

BACKGROUND OF THE INVENTION

1. Field of the Invention

The present invention relates to an improved device for aeration of soil. More particularly, the present invention relates to the aeration of lawns and soils used in agriculture with a shovel shaped aerator design mounted on a drum having a penetration adjustment means. The penetration adjustment allows aeration depth to be chosen. Further, the present invention has a rake setting that angles the spikes to move soil sideways to the direction of travel. This allows better aeration and the ability to select the degree of soil loosening desired.

2. Description of the Prior Art

Aeration apparatus are well known in the art for the beneficial affects in lawn and agricultural service. It is of course well known that soil needs to be aerated from time to time to encourage growth of a crop by facilitating the access of air, moisture and nutrients to its roots. Aeration, also provides room for the roots to grow. Large areas are aerated using some form of a vehicle born aeration equipment, the most typical form is tractor towed or self propelled. Generally, it is not desirable to disturb the surface of the soil, so, various means have been shown in the art. Typically aerators make use of devices that extract plugs of soil or punch holes in the soil. The plug extracting devices leave a residue of plugs on the surface of the soil. This residue is undesirable and unsightly on playing fields where the condition of the surface is very important to the sports person. The devices that punch holes into the soil have a aeration affect that is limited to a small area around the diameter of the spike. Stimulating root growth requires disturbing the soil around the roots, so it is desirable to disturb the soil as much as possible with out mutilating the surface. The plug and spike devices tend to move the soil with in a very limited range of the device itself. The amount of aeration is also dependant on the depth that the spikes or plugs penetrate the soil. The depth that the plug or spike configuration penetrate the soil depends two factors: first the force used to push the device into the soil and secondly the hardness of the soil.

Numerous innovations for aerators have been provided in the prior art that are described as follows. Even though these innovations my be suitable for the specific individual purposes to which they address, they differ from the present invention as hereinafter contrasted.

In 198,241, titled Improvement Appliance for Producing Artificial Ventilation of the Turf and Soil of Golf Greens and other Greens and Lawns, invented by William Godfrey Moltneux Sarel comprises a roller mounted to be drawn over the green as with an ordinary lawn roller and characterized in that its periphery is furnished with an plurality of fixed spikes covering its entire area. Spikes so mounted penetrate the ground when the roller is drawn over the green, and although making a surface hole not more than the cross sectional area of the spike, they have a splaying and soil disturbing movement under the crust.

The patented invention is designed to be hand drawn. The patented invention does not have a relies on the soil conditions to determine the depth of penetration of the aeration, The spikes on the patented invention are of a round cross section which aerates the soil for only a short distance outwardly from the diameter of the spike. The current invention has a triangular shaped spike which has been shown to aerate a greater volume of soil.

The patented invention spikes are set in rows on rollers which are towed perpendicular to the direction of travel. The current invention has a rake adjusting means to angle the rollers relative to the direction of travel which in turn causes the triangular spikes to create a lateral movement of the soil. The lateral movement causes a greater aeration of the soil.

The patented invention is not designed to be towed by a tractor but pushed by hand so it is limited in size and will be much more costly to operate over large areas.

In 679,253, titled, Improvements in machines or implements for aerating the ground, invented by Kenneth Edward Goit comprises machine or implement for aerating the ground using a ground wheel which has aerating devices mounted therein penetrating the circumference of the wheel. The wheels are mounted on shafts perpendicular to the direction of travel. Each shaft has an independent suspension so that the wheels are in contact with the ground when traversing uneven terrain.

The patented invention is designed to be tractor drum comprising a plurality of spikes arranged on the circumference of disks. Each disk is independently pushed into the ground by a spring. Depth adjustment is accomplished to a limited degree by changing the spring. This is a very time consuming process for the agricultural worker. The individual suspension of the patented invention results in the aeration device following the terrain rather than providing any leveling means. A non-level surface results in water pooling and nonuniform crop or grass growth. The patented invention does not have an easily implemented spike depth adjusting means. The current invention selects the penetration depth by filling the drums with water or other fluid. The increased mass causes the spikes to be pressed further into the ground. The patented invention spikes are set on disks and the entire apparatus is towed perpendicular to the direction of travel. The current invention has a rake adjusting means to angle the rollers relative to the direction of travel which in mm causes the triangular spikes to create a lateral movement of the soil. The lateral movement causes a greater aeration of the soil.

In U.S. Pat. No. 4,094,363, titled Cultivating Implements, invented by John Michael McCoomb comprises a cultivating implement having freely rotatable tine members mounted on axles set at an angle other than normal to the direction of travel of the implement over the ground, the tine members comprising a plurality of forwardly arcuately curved tines having chisel shaped tips which produce sideways cutting action through the soil as the implement is moved over the ground.

The purpose of the patented invention is to till the soil between the rows of crops. It grossly disturbs the soil so that weed growth is controlled between the rows by upsetting the weeds, thus exposing the roots to sun and air causing the to die. This device is not an aerator, but a tiller. The current invention is designed to aerate the soil while minimizing the surface disturbance.

In U.S. Pat. No. 4,383,580, titled Agricultural Implements, invented by Paul M. Huxford comprises soil aerator in a frame attachable to the three point linkage of a tractor, a plurality of shafts rotatably mounted on the frame and a plurality of cutters blades projecting from each of the rollers. The blades are formed from plate material and are preferably formed to a point. Various edges are preferably beveled to assist the implement in cutting the soil with out undue lifting or tearing of the soil surface.

The patented invention is designed to be tractor drawn and comprises a plurality of spikes arranged on rotating axles. The patented invention has no depth adjusting means other than the weight of the frame and addition of weights in a limited area. Further, the spike shape and the small radius of travel, causes the spike to tear the soil and grossly disturb the surface which is undesirable when aerating an established lawn. The triangular shaped spike, rotating on a much larger radius, of the current invention aerates more soil with out tearing the surface. The spikes on the patented invention are set on axles, the central two of which are set at a fixed angle to the direction of travel. The current invention has spikes mounted on larger radius drums which when the spike is inserted and withdrawn from the soil results in less tearing of the surface and better aeration.

In U.S. Pat. No. 4,619,329, titled Soil Aerator, invented by Clean Gorbett comprises a soil aerator which a includes a frame and a rotatable drum mounted on the frame. The drum has an outer cylindrical surface. The opposing ends of the drum are enclosed and carry axles which are mounted within the frame whereby the drum is rotatable with respect to the frame about the longitudinal axis of the drum. Each of the rows of teeth forms a chevron-shaped pattern with respect to the next succeeding row of teeth.

The patented invention comprises a single drum which is towed behind a vehicle. The current invention has multiple drums. The rotating drum cannot be raked to provide more aeration.

In U.S. Pat. No. 4,776,404, Titled, Multiple Unit Turf Aerator, invented by Steven D. Rogers comprises an implement for aerating and detaching golf courses, athletic fields, and other sodded fields has multiple aerator units each including a plurality of earth piercing aerator elements mounted on a shaft. Arms of each aerator unit supporting the shafts are independently swing able to move the shafts between horizontal positions and positions inclined from the horizontal in accordance with the contour of the ground or encountered soil conditions as the aerator is advanced across the earth. A spring assembly urging each aerator toward the ground has a structure for causing any upward swinging movement of the arms of each unit to be resisted by the weight of the frame whenever such arms are pivoted upwardly past a predetermined elevation, in order to provide additional force where highly compacted soil conditions are found. Springs common to adjacent aerator units engage a bracket that is shiftable connected to adjacent arms of the units to enable the common spring to direct its extension force on the arm which is in the higher position.

The patented invention is designed to be tractor drawn and comprises a plurality of spikes contained on disks which are independently pushed into the ground by a individual weight attached to each disk. While adjusting the depth is accomplished by changing the weights. This is a very time consuming process and would not be accomplished in the field by an agricultural worker.

The current invention selects the penetration depth by filling the drums with water or other fluid. The increased mass causes the spikes to be pressed further into the ground. The patented invention spikes are set on disks and the entire apparatus is towed perpendicular to the direction of travel. The current invention has a rake adjusting means to angle the rollers relative to the direction of travel which in turn causes the triangular spikes to create a lateral movement of the soil. The lateral movement causes a greater aeration of the soil.

In U.S. Pat. No. 4,840,232, Titled, Soil Aerating Equipment, invented by Matthew E. Mayer comprises a frame moveable in an intended direction of travel, and at least a pair of shafts freely rotatably mounted on the frame for rotation about the shaft longitudinal axis. The shafts extending in rearwardly inclined opposite directions on opposite sides of center line of the frame extending in the direction of travel. The rearward inclination of the shafts is adjustable to desired angles in the range of from about 90° to about 120° to the direction of travel. Each shaft carries a series of soil engaging substantially planer tines extending therefrom in vertical planes and positioned to sequentially engage and penetrate the soil with consequent rotation of the shafts when the frame is moved in the direction of travel. Each fine has a central longitudinal axis which extends behind the shaft rotational axis at a distance therefrom in the range from about 0.25 to about 1.75 inches, and each fine is twisted about the fine central longitudinal axis at an angle to a vertical plane parallel to the direction of travel in the range of from about 1° to about 30°.

The patented invention is designed to be drawn by a vehicle and comprises a plurality of spike contained on disks which are pushed into the ground by the weight of the apparatus. The patented invention does not have an spike depth adjusting means.

The current invention selects the penetration depth by filling the drums with water or other fluid. The increased mass causes the spikes to be pressed farther into the ground. The patented invention spikes are set on disks and the entire apparatus is towed perpendicular to the direction of travel. The current invention has a rake adjusting means to angle the rollers relative to the direction of travel which in turn causes the triangular spikes to create a lateral movement of the soil. The lateral movement causes a greater aeration of the soil.

In U.S. Pat. No. 5,029,652, Titled, Turf Aerator with Lateral Tine Movement, invented by Carroll J. Whitfield comprises an apparatus for aerating turf including a mounting frame for mounting the apparatus to the hydraulic lift system of an utility tractor. A trailer support frame is pivotally mounted to the mounting frame so as to enable the trailer support frame to tilt toward and away from engagement with the turf. A plurality of rotational hoes are supported within the trailer support frame along a drive shaft. The drive shaft is rotated by the power take-off of the tractor, and causes the rotationally hoes to vibrate as the tines of the rotary hoes penetrate the soil so as to aerate the turf without causing compaction of the soil.

The patented invention is designed to be tractor drawn and comprises a plurality of spike containing disks which are pushed into the ground. The patented invention also has a means of rotating the disks faster or slower than the speed of travel making the patented invention more complex. The patented invention does not have an easily implemented spike depth adjusting means. Further, the spike shape is circular in cross section in the patented invention which aerates the soil a short distance away from the diameter of the spike whereas the current invention has an triangular shaped spike. The triangular shaped spike of the current invention aerates more soil. The spikes are set on disks in the patented invention and the entire apparatus is towed perpendicular to the direction of travel. Whereas the current invention has a rake adjusting means to angle the rollers relative to the direction of travel. When the current invention is used in conjunction with a rake adjusting means disturbs the soil for a greater away from the aeration device.

In U.S. Pat. No. 5,353,724, Titled, Roto-Tiller Attachment, invented by Robert B. Wheeley comprises an attachment of roto-tiller adapted to aerate and fertilize ground in preparation for seeding and planting which comprises a pair of rotatable cylinders adapted to replace the conventional tiller tines and to attached to the rotatable shaft driven by the roto-tiller unit; a plurality of spaced aerating spike members distributed uniformly around each of the cylinders; the openings likewise being uniformly distributed about the external periphery of the cylinders; spring-loaded dispenser plugs positioned in the openings to be activated be each contact with the ground as the unit moves and the cylinders rotate; and dispensing valves located within the ports of the cylinders to dispense liquid fertilizer from the inside the cylinders.

The patented invention comprises a drum around which spikes are attached. Dispensers are provided to release fertilizer or other powders or liquids. There is not means of controlling the depth of penetration other than the mass of the combined roller and product being dispensed. The dispensers are designed such that ground contact is necessary to release the fertilizer, or other powder or liquid. Ground contact may not be easily achieved in hard soils resulting in non-uniform dispensing. The current invention solves this problem by utilizing a fluid contained with in a drum for mass adjustment. Because the fluid is not dispensed, the mass is not changed and the correct penetration is easily achieved. The patented invention uses circular shaped spikes. The current invention uses triangular shaped spikes that aerate more thoroughly. In the patented invention the rollers cannot be set to an angle to the direction of travel whereas the current invention has a rake adjusting means.

In U.S. Pat. No. 5,398,768, Titled, Aerator, invented by Clarke H. Staples comprises a frame supported on a pair of forward drive wheels and a pair of rearward caster wheels. An aerator head is mounted on a pivot frame on the forward end of the aerator frame, pivot able to move the aerator head from a disengaged position above the ground, downwardly to an engaged position wherein tines on the aerator head work the soil. The pivot frame includes a forwardly projecting arm upon which the aerator head is mounted, and a rearwardly projecting arm upon which the forward wheels of the frame are mounted such that movement of the pivot frame will engage either the forward wheels of the frame or the aerator head with the ground. The aerator head is mounted forwardly of the forward end of the frame such that the tines on the aerator head form the forward most part of the aerator.

The patented invention is self propelled. The current invention is designed to be towed by a vehicle. The aeration means of the patented invention is further designed to churn the soil in preparation for crop planting. The churning motion would tear the turf to an extreme degree in an established lawn resulting in an unsightly appearance. The current invention prevents the tearing. The patented invention has no means for depth adjustment independent of the churning the soil more by restraining the forward progress of the device.

Numerous innovations for Enhanced Aerator have been provided in the prior art that are adapted to be used. Even though these innovations may be suitable for the specific individual purposes to which they address, they would not be suitable for the purposes of the present invention as heretofore described.

SUMMARY OF THE INVENTION

The use of aerators is known in the prior art and describe as opening holes in the ground in preparation for planting utilizing a tine of circular cross section or a device that removes a plug from the soft depositing the plug on the surface. The debris from the plugs have an unsightly appearance and are undesirable for a playing field. The actual aeration is limited to a small area around the circular tines. A number of unsuccessful attempts to increase the aeration were attempted namely: increasing the length of the tines and adding weight to press the tines further into the soil. Though some improvement was obtained the results were still limited to a small area surrounding the tine. Increasing the number of tines decreased the depth of penetration for the same weight. So, the inventions of the prior art needed multiple passes to increase the aeration. This greatly increases the cost and time required to provide adequate aeration. However, the problem was solved by the present invention because it uses triangular shaped tines or spikes that in addition to being pressed into the soil are pulled at an angle. The resultant side lead pushes the soil transversely to the direction of travel greatly increasing the area of soil disturbance, and keeping the surface clean of debris. Because the area of soil disturbance is greatly increased, multiple passes are not required, thus reducing the aeration cost.

Innovations within the prior art are rapidly being exploited in the consumer market for use in lawn care products and devices for commercial landscapers.

The present invention solved a long felt need for an aeration device that increase the degree of aeration and reduce the over all cost of the process.

The present invention produced unexpected results namely the reduction of costs for commercial users by limiting the number of passes over a soil surface required to achieve the desired aeration results.

A synergistic effect was produced utilizing the present invention in that multiple passes were reduced or eliminated and the resultant aeration was more thoroughly disbursed through out the soil area.

A further synergistic affect was achieved by the leveling or smoothing effect of the drums which reduces pooling and run off of rain or irrigation water so that moisture content of the soil is more uniformly distributed resulting in more uniform crop growth and consistency of produce.

A still further synergistic affect of the invention is the homogeneous coloring of lawn that results from uniform growth through out a lawn area.

Accordingly, it is an object of the present invention to provide aeration to multiple soil mixtures utilizing the same device.

More particularly, it is an object of the present invention to provide aeration which is selectable and adjustable to achieve the desired result.

In keeping with these objects, and with others which will become apparent hereinafter, one feature of the present invention resides, briefly stated, in the shape of the spikes that increases the range of aeration achieved as measured from the spike in an outwardly direction.

Another feature of the invention is that the rake of the drums increases the depth of penetration of the aeration.

Still another feature of the invention is that the tilting movement of the drums tends to level or smooth the soil.

The novel features which are considered characteristic for the invention are set forth in the appended claims. The invention itself; however, both as to its construction and its method of operation, together with additional objects and advantages thereof, will be best understood from the following description of the specific embodiments when read and understood in connection with the accompanying drawing(s).

BRIEF LIST OF REFERENCE NUMERALS UTILIZED IN THE DRAWING

10—enhanced agricultural aerator (10)
12A—frame (12)
12A—frame longitudinal member (12A)
12A2—frame longitudinal member extension (12A2)
12A1—frame hitch pin hole (12A1)
12A3—frame hitch pin (12A3) (not shown)
12AL—frame left transverse member (12AL)
12AL1—frame left connecting pin (12AL1)
12AL2—frame left pivot joint (12AL2)
12AL3—frame left rear member (12AL3)
12AL4—frame left rear member motion (12AL4)
12AR—frame right transverse member (12AR)
12AR1—frame right connecting pin (12AR1)
12AR2—frame right pivot joint (12AR2)
12AR3—frame right rear member (12AR3)
12AR4—frame right rear member motion (12AR4)
14A—right aerator (14A)
14AB—right aerator right end (14AB)
14AB1—right aerator fill (14AB1)
14AC—right aerator left end (14AC)
14AD—right aerator drum surface (14AD)
14AE—right aerator axle (14AE)
14AF1—right aerator axle right bearing (14AF1)
14AF2—right aerator axle left bearing (14AF2)
14B—left aerator (14B)
14BB—left aerator left end (14BB)
14BB1—left aerator fill (14BB1)
14BC—left aerator right end (14BC)
14BD—left aerator drum surface (14BD)
14BE—left aerator axle (14BE)
14BF1—left aerator axle right bearing (14BF1)
14BF2—left aerator axle left bearing (14BF2)
16A—rake adjusting bracket (16A)
16B—rake adjusting Handel (16B)
16C—rake adjusting screw (16C)
18—aerator spike (18)
18A—aerator first spike (18A)
18A1—aerator first spike center crease(18A1)
18A2—aerator first spike side (18A2)
18A3—aerator first spike forward side (18A3)
18A4—aerator first spike weld joint (18A4)
18A5—aerator first spike section line (18A5)
18A6—aerator first drum surface (18A5)
18A7—aerator end (18A7)
18A8—aerator first spike angle (18A8)
18A9—aerator first spike load direction (18A9)
18B—aerator second spike (18B)
18B1—aerator second spike radius (18B1)
18B2—aerator second spike side (18B2)
18B3—aerator second spike rear side (18B3)
18B4—aerator second spike weld joint (18B4)
18B5—aerator second spike section line (18B5)
18B6—aerator second drum surface (18B6)
18B7—aerator drum end (18B7)
18B8—aerator second spike load direction (18B8)
22A—right aerator drum roll position motion (22A)
22A1—right aerator drum roll position 1 (22A1)
22A2—right aerator drum roll position 2 (22A2)
22A3—right aerator drum roll position 3 (22A3)
22B—left aerator drum roll position motion (22B)
22B1—left aerator drum roll position 1 (22B1)
22B2—left aerator drum roll position 2 (22B2)
22B3—left aerator drum roll position 3 (22B3)
24—farm tractor (24)

BRIEF DESCRIPTION OF THE PREFERRED EMBODIMENT

FIG. 3B is a cross section view of a first embodiment of a spike.

FIG. 4B is a cross section view of a second embodiment of a spike.

DETAILED DESCRIPTION OF THE PREFERRED EMBODIMENT

Figure 1:
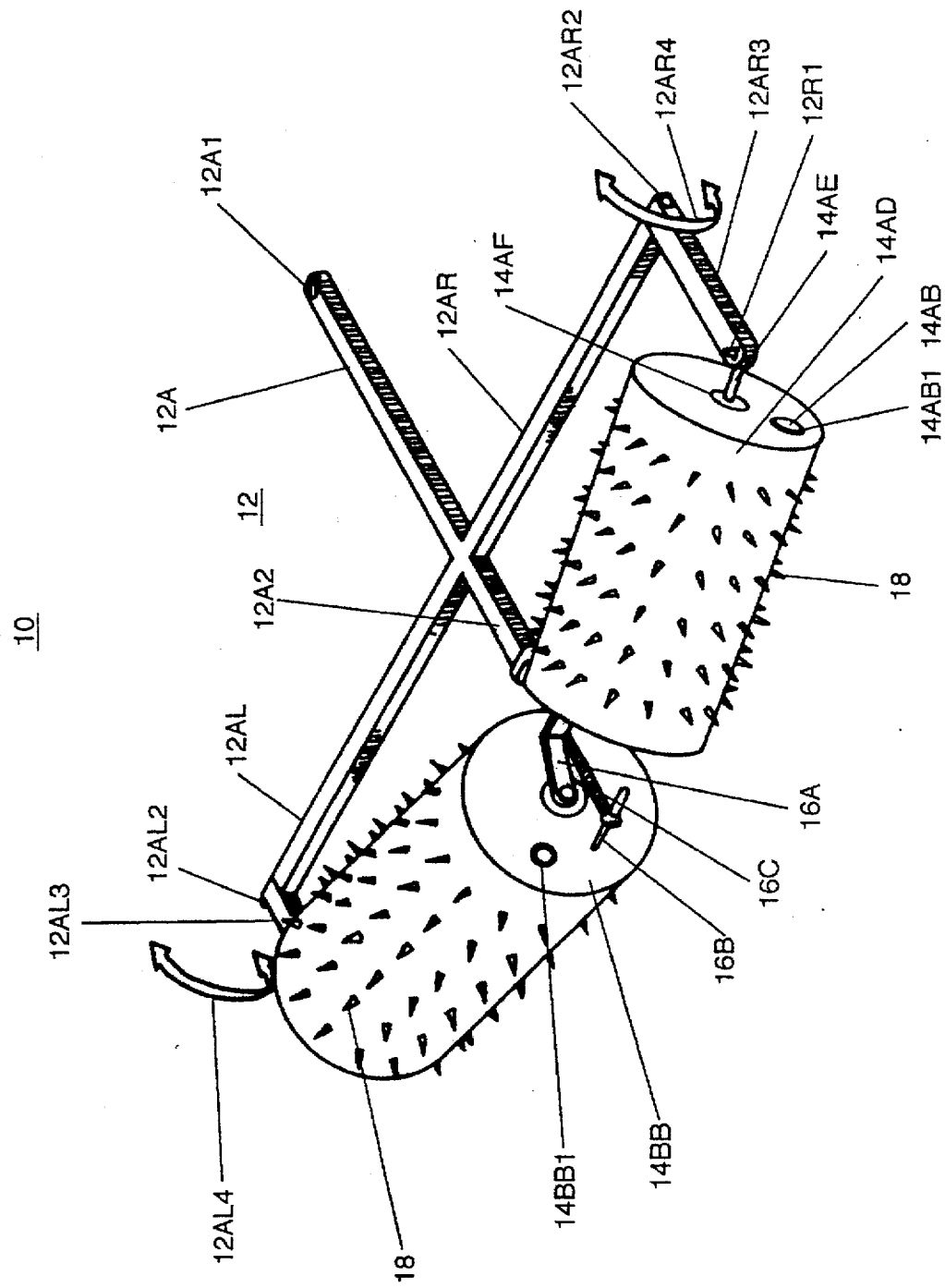
FIG. 1 is a right rear perspective view of an enhanced agricultural aerator having a pair of aerator drums rotationally fastened to a frame further comprising a rake adjusting device.

Firstly, referring to FIG. 1 which is a right rear perspective view of an enhanced agricultural aerator (10) having a pair of aerator drums rotationally fastened to a frame exhibiting the following features: enhanced agricultural aerator (10), frame (12), frame longitudinal member (12A), frame hitch pin (12A3) (not shown), frame hitch pin hole (12A1), frame left transverse member (12AL), frame left longitudinal member (12AL1), frame left pivot joint (12AL2), frame right transverse member (12AR), frame right longitudinal member (12AR1), frame right pivot joint (12AR2), right aerator (14A), right aerator right end (14AB), right aerator fall (14AB1), right aerator left end (14AC), right aerator drum surface (14AD), right aerator axle (14AE), right aerator axle right bearing (14AF1), right aerator axle left bearing (14AF2), left aerator (14B), left aerator left end (14BB), left aerator fill (14BB1), left aerator left end (14BC), left aerator drum surface (14BD), left aerator axle (14BE), left aerator axle right bearing (14BF1), left aerator axle left bearing (14BF2), rake adjusting bracket (16A), rake adjusting handle (16B), rake adjusting screw (16C), and aerator first spike (18A).

The enhanced agricultural aerator (10) is removably attached to a farm or residential tractor (24) by a frame hitch pin (12A3) (not shown) which goes through a frame hitch pin hole (12A1) in a frame longitudinal member (12A). The frame longitudinal member (12A) is securely attached to a frame left transverse member (12AL) on one side and a frame right longitudinal member (12AR1) on the opposite side. The frame left transverse member (12AL) and the frame right transverse member (12AR) in conjunction with a frame longitudinal member extension (12A2) provide a towing means when attached to a right aerator (14A) and a left aerator (14B) at their respective distal ends.

The frame left transverse member (12AL) is securely attached to a frame left pivot joint (12AL2). The frame left pivot joint (12AL2) is pivotally attached to a frame left rear member (12AL3) and permits the left aerator left end (14BB) to move through a frame left rear member motion (12AL4) upwardly and downwardly when it transverses a bump in the ground.

The frame right transverse member (12AR) is securely attached to a frame right pivot joint (12AR2). The frame right pivot joint (12AR2) is pivotally attached to a frame right rear member (12AR3) and permits a right aerator right end (14AB) to move through a frame right rear member motion (12AR4) upwardly and downwardly when the left aerator (14B) transverses a bump in the ground.

The frame left rear member (12AL3) is rotationally attached to the right distal end of a left aerator axle (14BE) by a frame left connecting pin (12AL1). The left aerator axle (14BE) is rotationally attached to a left aerator axle left bearing (14BF2) which is further rotationally attached to a left aerator left end (14BB). The left aerator left end (14BB) is securely attached about its circumference to a left aerator drum surface (14BD). The left aerator drum surface (14BD) is securely attached to a left aerator right end (14BC). The left aerator right end (14BC) having a left aerator fill (14BB1) which is used to add mass to the left aerator (14B), the additional mass increases the penetration of an aerator first spike (18A) into the soil. The left aerator right end (14BC) is rotationally attached to a left aerator axle right bearing (14BF1) which further is attached to the left distal end of a left aerator axle (14BE).

The frame right rear member (12AR3) is rotationally attached to the right distal end of a right aerator axle (14AE) by a frame right connecting pin (12AR1). The right aerator axle (14AE) is rotationally attached to a right aerator-axle right bearing (14AF1) which is further attached to a right aerator right end (14AB). The right aerator right end (14AB) further comprises a right aerator fill (14AB1) which is used to add mass to the right aerator (14A). The additional mass increases the penetration of the aerator first spike (18A) into the soil. The right aerator right end (14AB) is securely attached about its circumference to a right aerator drum surface (14AD) on the right distal circumference. The right aerator drum surface (14AD) is securely attached to a right aerator left end (14AC) on the left circumference. The right aerator left end (14AC) is securely attached to a right aerator axle left bearing (14AF2) which is rotationally attached to the left distal end of the right aerator axle (14AE). The left distal end of the right aerator axle (14AE) is securely attached to one distal end of a rake adjusting bracket (16A).

The left aerator axle (14BE) is securely attached to one distal end of a rake adjusting bracket (16A). The opposite distal end of the rake adjusting bracket (16A) is securely attached to the right aerator axle (14AE). The rake adjusting bracket (16A) is rotationally attached at a midpoint to a rake adjusting screw (16C). The rake adjusting screw (16C) is securely attached to a rake adjusting handle (16B) which when turned in either direction causes the rake adjusting bracket (16A) to move forward or aft. This motion adjusts the rake angle of the right aerator (14A) and the left aerator (14B) relative to the direction of travel of the enhanced agricultural aerator (10).

The rake angle has a significant impact on the degree of soil disturbance produced. The larger the angle the further the away from an aerator first spike (18A) the soil is disturbed resulting in more aeration. This rake adjustment in conjunction with the mass adjustment allows the user to select the proper aeration for the soil condition.

Figure 2:
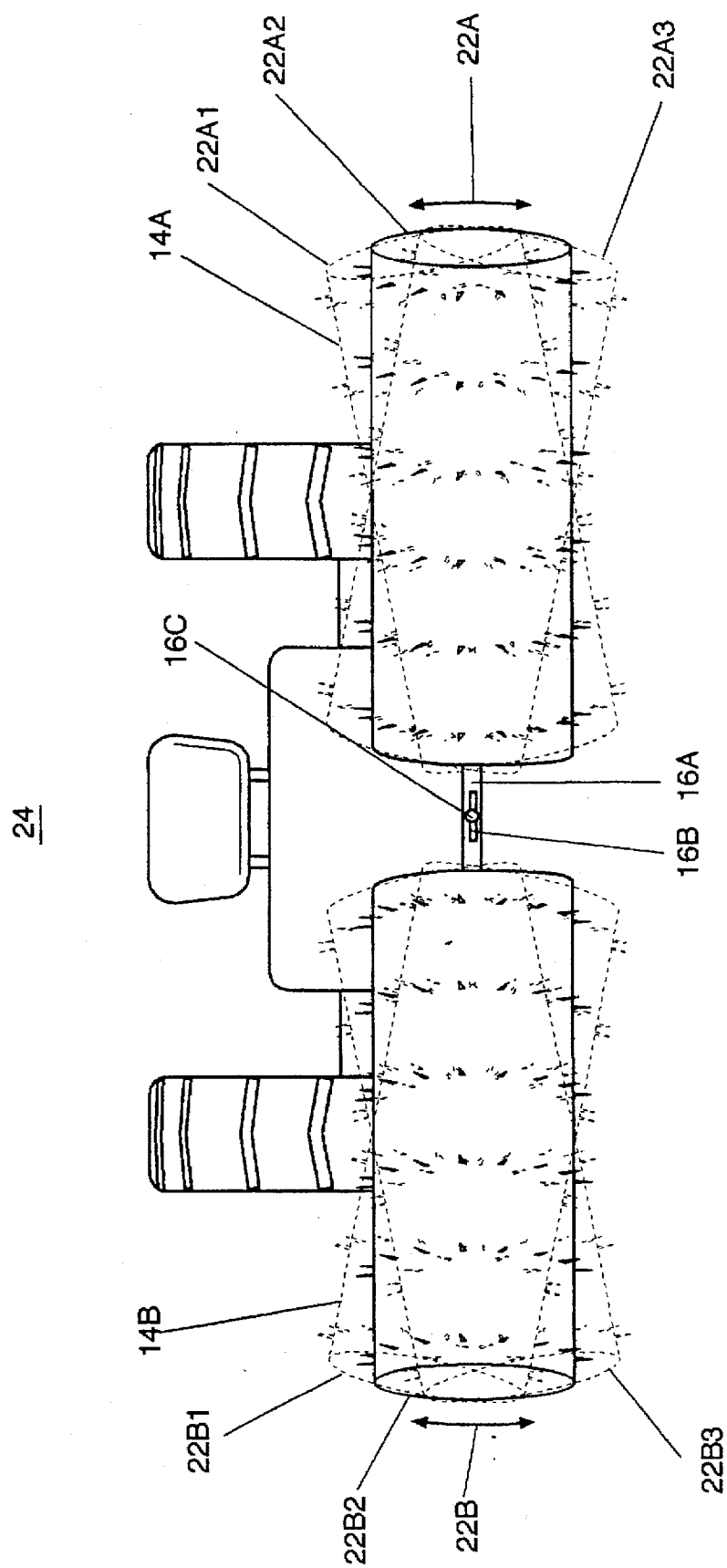
FIG. 2 is a rear view of an enhanced agricultural aerator being pulled by a farm tractor. The right aerator and left aerator are shown in several roll positions.

Secondly, referring to FIG. 2 which is a rear view of an enhanced agricultural aerator (10) being pulled by a farm tractor showing the right aerator (14A) and left aerator (14B) in several roll positions, exhibiting the following features: a right aerator drum roll position motion (22A), right aerator drum roll position 1 (22A1), right aerator drum roll position 2 (22A2), right aerator drum roll position 3 (22A3), left aerator drum roll position motion (22B), left aerator drum roll position 1 (22B1), left aerator drum roll position 2 (22B2), left aerator drum roll position 3 (22B3), rake adjusting bracket (16B), rake adjusting screw (16A), rake adjusting handle (16C), and farm tractor (24).

The enhanced agricultural aerator (10) is removably attached to a farm tractor (24). As the farm tractor (24) tows the enhanced agricultural aerator (10) over uneven ground the left aerator (14B) moves through a left aerator drum roll position motion (22B). The motion from a left aerator drum roll position 1 (22B1) to a left aerator drum roll position 2 (22B2) and finally to a left aerator drum roll position 3 (22B3), caused by the terrain, results in the left aerator (14B) flattening the soil.

As the right aerator (14A) moves through a right aerator drum roll position motion (22A) the motion from a right aerator drum roll position 1 (22A1) to a right aerator drum roll position 2 (22A2) and finally to a right aerator drum roll position 3 (22A3), caused by the terrain, results in the right aerator (14A) flattening the soil. The left aerator drum roll position motion (22B) and right aerator drum roll position motion (22A) repeatedly applied over the extent of an entire field results in the field terrain becoming more smooth.

The rake adjusting handle (16C) is securely attached to the rake adjusting screw (16A) which is rotatably attached to the rake adjusting bracket (16B). Turning the rake adjusting handle (16C) rotates the rake adjusting screw (16A) which causes the rake adjusting bracket (16B) to move which changes the rake angle of the right aerator (14A) and the left aerator (14B).

Figure 3A:
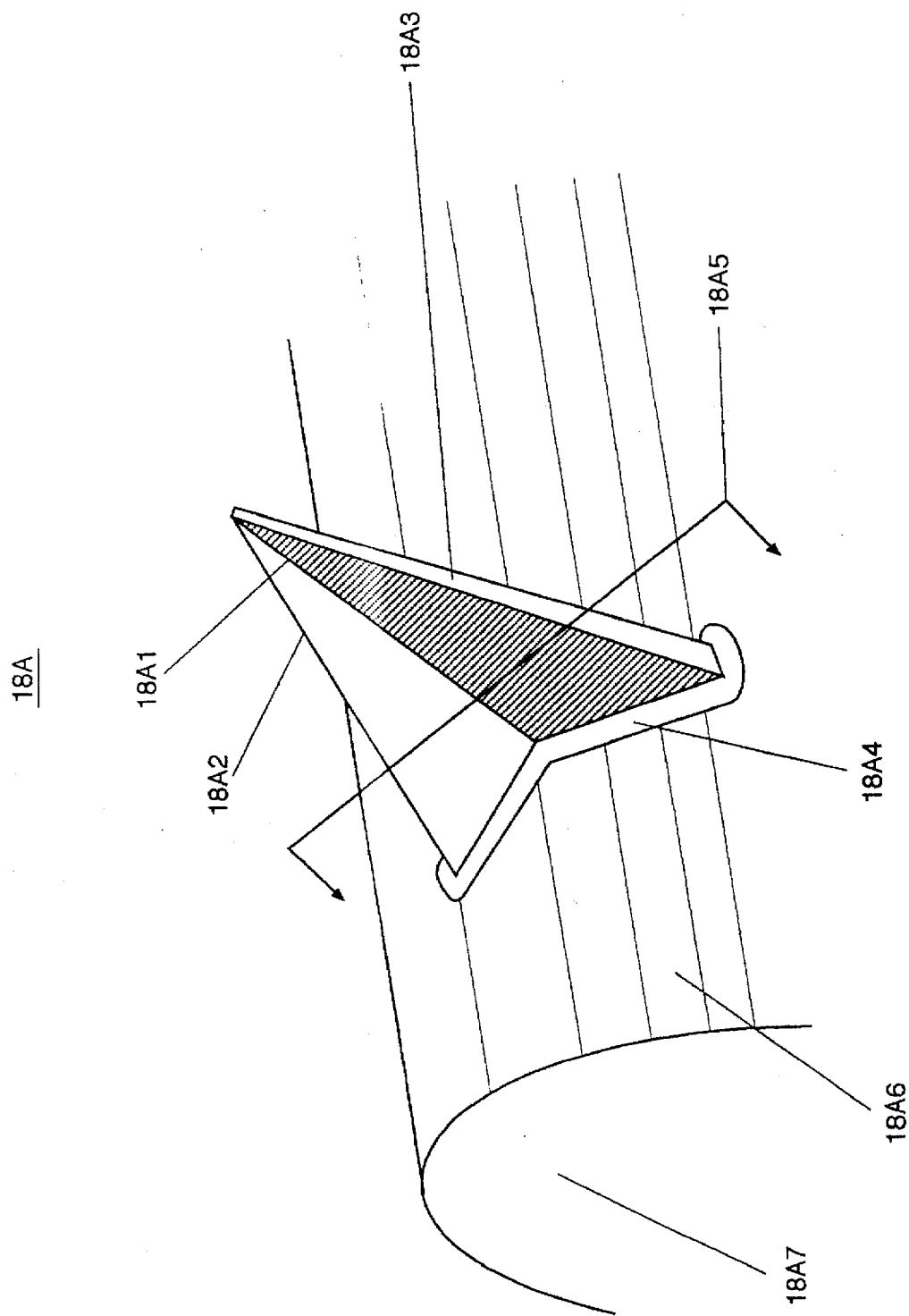
FIG. 3A is a perspective view of a first embodiment of a spike welded to an a aerator drum surface.

Referring to FIG. 3A which is a perspective view of a first embodiment of a spike welded to an aerator drum surface exhibiting the following features: aerator first spike (18A), aerator first spike center crease (18A1), aerator first spike side (18A2), aerator first spike forward side (18A3), aerator first spike weld joint (18A4), and aerator first spike section line (18A5).

The first embodiment of the aerator first spike (18A) is securely attached to the aerator first drum surface (18A6) in a plane parallel to a aerator end (18A7) by an aerator first spike weld joint (18A4). The aerator first spike (18A) further comprising an aerator first spike side (18A2) securely attached to an aerator first spike forward side (18A3) at an aerator first spike center crease (18A1). The shape of the aerator first spike (18A) at an aerator first spike section line (18A5) is shown in FIG. 3B.

The shape of the aerator first spike (18A) at an aerator first spike section line (18A5) simplifies fabrication to using a break to form the angle resulting in the necessary ridged being added.

Now referring to FIG. 3B which is a cross section view of a first embodiment of a spike exhibiting the following features: aerator first spike angle (18A8), aerator first spike center crease (18A1), aerator first spike side (18A2), aerator first spike forward side (18A3), aerator first spike angle (18A8), and aerator first spike load direction (18A9).

The aerator first spike (18A) having an aerator first spike center crease(18A1) which securely attaches the aerator first spike side (18A2) to the aerator first spike forward side (18A3) at an aerator first spike angle (18A8). The aerator first spike angle (18A8) between the aerator first spike side (18A2) to the aerator first spike forward side (18A3) provides ridged the aerator first spike (18A) so that it will not bend when subjected to side loads along an aerator first spike load direction (18A9).

Figure 4A:
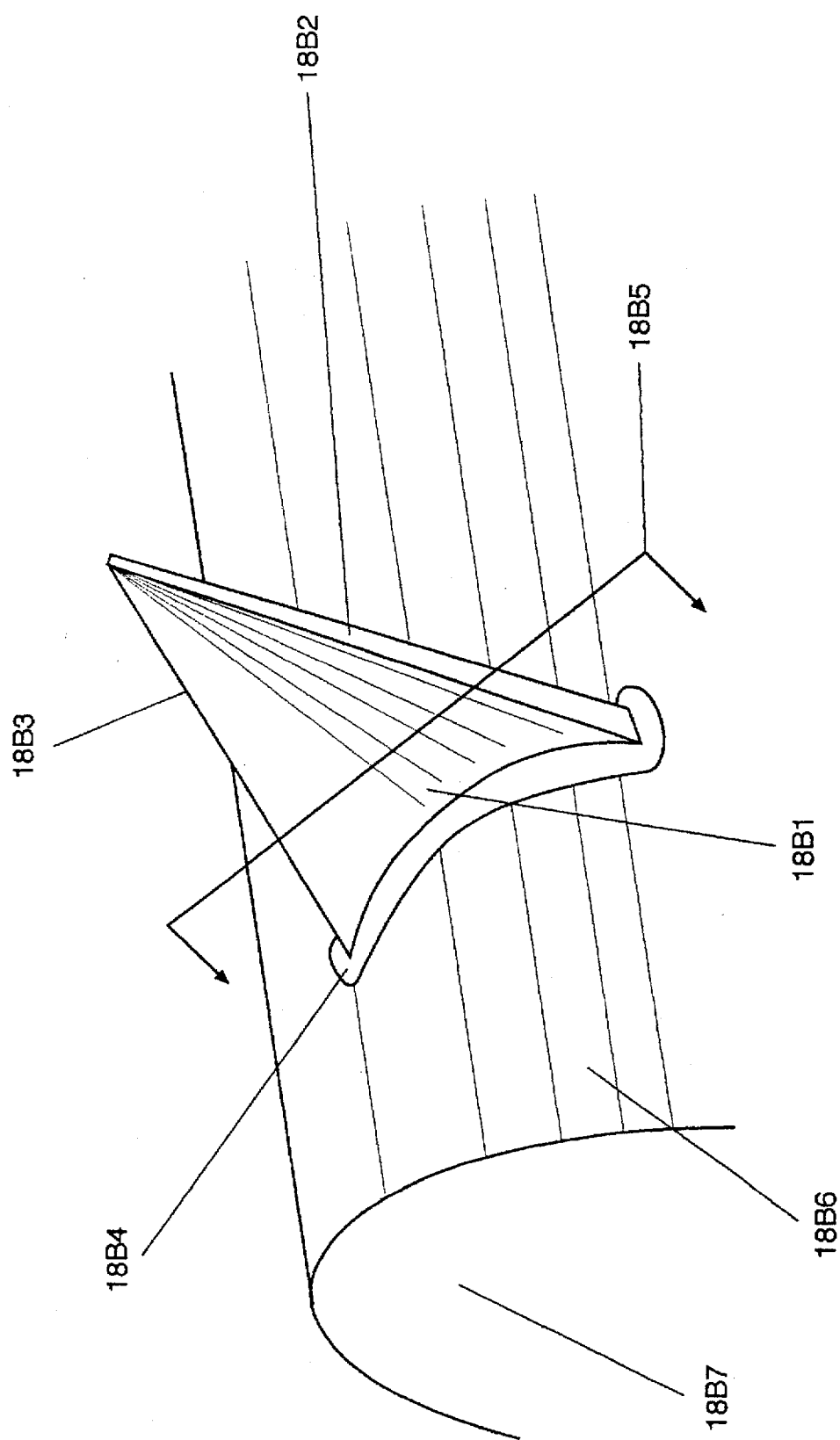
FIG. 4A is a perspective view of a second embodiment of a spike welded to an aerator drum surface.

Now referring to FIG. 4A which is a perspective view of a second embodiment of a spike welded to an aerator drum surface exhibiting the following features: aerator second spike (18B), aerator second spike radius (18B1), aerator second spike side (18B2), aerator second spike rear side (18B3), aerator second spike weld joint (18B4), and aerator second spike section line (18B5).

The second embodiment of the aerator second spike (18B) is securely attached to the aerator second drum surface (18B6) in a plane parallel to the aerator drum surface (18B7) by an aerator second spike weld joint (18B4). The aerator second spike (18B) further comprising an aerator second spike side (18B2) securely attached to an aerator second spike rear side (18B3) at an aerator second spike center crease (18B1). The shape of the aerator second spike (18B) at an aerator second spike section line (18B5) is shown in FIG. 4B.

Lastly referring to FIG. 4B which is a cross section view of a second embodiment of a spike exhibiting the following features: aerator second spike (18B), aerator second spike radius (18B1), aerator second spike section line (18B5) and aerator second spike radius (18B1).

The shape of the aerator second spike (18B) at an aerator second spike section line (18B5) simplifies fabrication to cutting the aerator second spike (18B) from a tube section of aerator second spike radius (18B1) to obtain an arc resulting in the necessary ridged being added to the aerator second spike (18B).

It will be understood that each of the elements described above, or two or more together, may also find a useful application in other types of constructions differing from the type described above is a perspective view of a first embodiment of a spike welded to an aerator drum surface.

While the invention has been illustrated and described as embodied in a ENHANCED AGRICULTURAL AERATOR, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An enhanced agricultural aerator (10) removably attachable to a farm tractor (24) by a frame hitch pin hole (12A1) and a frame hitch pin (12A3), the enhanced agricultural aerator (10) comprising:

(A) a frame (12) which comprises a frame longitudinal member (12A) securely fastened to a frame longitudinal member extension (12A2) and securely fastened to a frame left transverse member (12AL) and securely fastened to a frame right transverse member (12AR), the frame left transverse member (12AL) pivotally attached to a frame left rear member (12AL3), the frame right transverse member (12AR) pivotally attached to a frame right rear member (12AR3);

B) a right aerator (14A) rotatably attached to the frame right rear member (12AR3) by a right aerator axle (14AE) fastened thereto by a frame right connecting pin (12AR1), the frame right rear member (12AR3) attached to the frame right transverse member (12AR) by a frame right pivot joint (12AR2), the right aerator (14A) having a right aerator drum surface (14AD) with a plurality of aerator spikes (18) mounted thereon;

C) a left aerator (14B) rotatably attached to the frame left rear member (12AL3) by a left aerator axle (14BE) fastened thereto by a frame left connecting pin (12AL1), the frame left rear member (12AL3) rotatably attached to the frame left transverse member (12AL) by a frame left piviot joint (12AL2), the left aerator (14B) having a left aerator drum surface (14BD) with a plurality of aerator spikes (18) mounted thereon;

D) a rake adjusting member (16) which comprises a rake adjusting bracket (16A) having a rake adjusting screw (16C) threadably mounted at a midpoint of the rake adjusting bracket (16A), the rake adjusting screw (16C) further comprises a rake adjusting handle (16B) securely fastened thereto, the rake adjusting bracket (16A) rotatably fastened at a left distal end to the left aerator axle (14BE) and rotatably fastened at a right distal end to the right aerator axle (14AE).

2. The enhanced agricultural aerator (10) as described in claim 1, wherein the right aerator axle (14AE) is rotatably mounted in a right aerator axle right bearing (14AF1) positioned on a right aerator right end (14AB), the right aerator axle (14AE) is further rotatably mounted in a right aerator axle left bearing (14AF2) positioned on a right aerator left end (14AC).

3. The enhanced agricultural aerator (10) as described in claim 1, wherein the right aerator (14A) further comprises a right aerator fill (14AB1).

4. The enhanced agricultural aerator (10) as described in claim 1, wherein the left aerator axle (14BE) is rotatably mounted in a left aerator axle right bearing (14BF1) positioned on a left aerator left end (14BB), the left aerator axle (14BE) is further rotatably mounted in a left aerator axle left bearing (14BF2) positioned on a left aerator left end (14BC).

5. The enhanced agricultural aerator (10) as described in claim 1, wherein the right aerator (14A) further comprises a left aerator fill (14BB1).

6. The enhanced agricultural aerator (10) as described in claim 1, wherein the plurality of aerator spikes (18) are selected from a group of spikes consisting of aerator first spikes (18A) and aerator second spikes (18B).

7. The enhanced agricultural aerator (10) as described in claim 6, wherein the aerator first spike (18A) further comprises an aerator first spike side (18A2) and an aerator first spike forward side (18A3) separated by an aerator first spike center crease (18A1).

8. The enhanced agricultural aerator (10) as described in claim 7, wherein the aerator first spike (18A) is securely fastened to an aerator first drum surface (18A6) by an aerator first spike weld joint (18A4).

9. The enhanced agricultural aerator (10) as described in claim 7, wherein the aerator first spike side (18A2) and an aerator first spike forward side (18A3) are positioned in an aerator first spike angle (18A8).

10. The enhanced agricultural aerator (10) as described in claim 7, wherein the aerator first spike (18A) is positioned in an aerator first spike load direction (18A9) upon the aerator first drum surface (18A6).

11. The enhanced agricultural aerator (10) as described in claim 6, wherein the aerator second spike (18B) further comprises an aerator second spike side (18B2) and aerator second spike rear side (18B3) configured in an aerator second spike radius (18B1).

12. The enhanced agricultural aerator (10) as described in claim 6, wherein the aerator second spikes (18B) is securely fastened to an aerator second drum surface (18B6) by an aerator second spike weld joint (18B4).

13. The enhanced agricultural aerator (10) as described in claim 11, wherein the aerator second spikes (18B) is positioned in an aerator second spike load direction (18B8) upon the aerator first drum surface (18A6).

* * * * *